Patented Oct. 23, 1923.

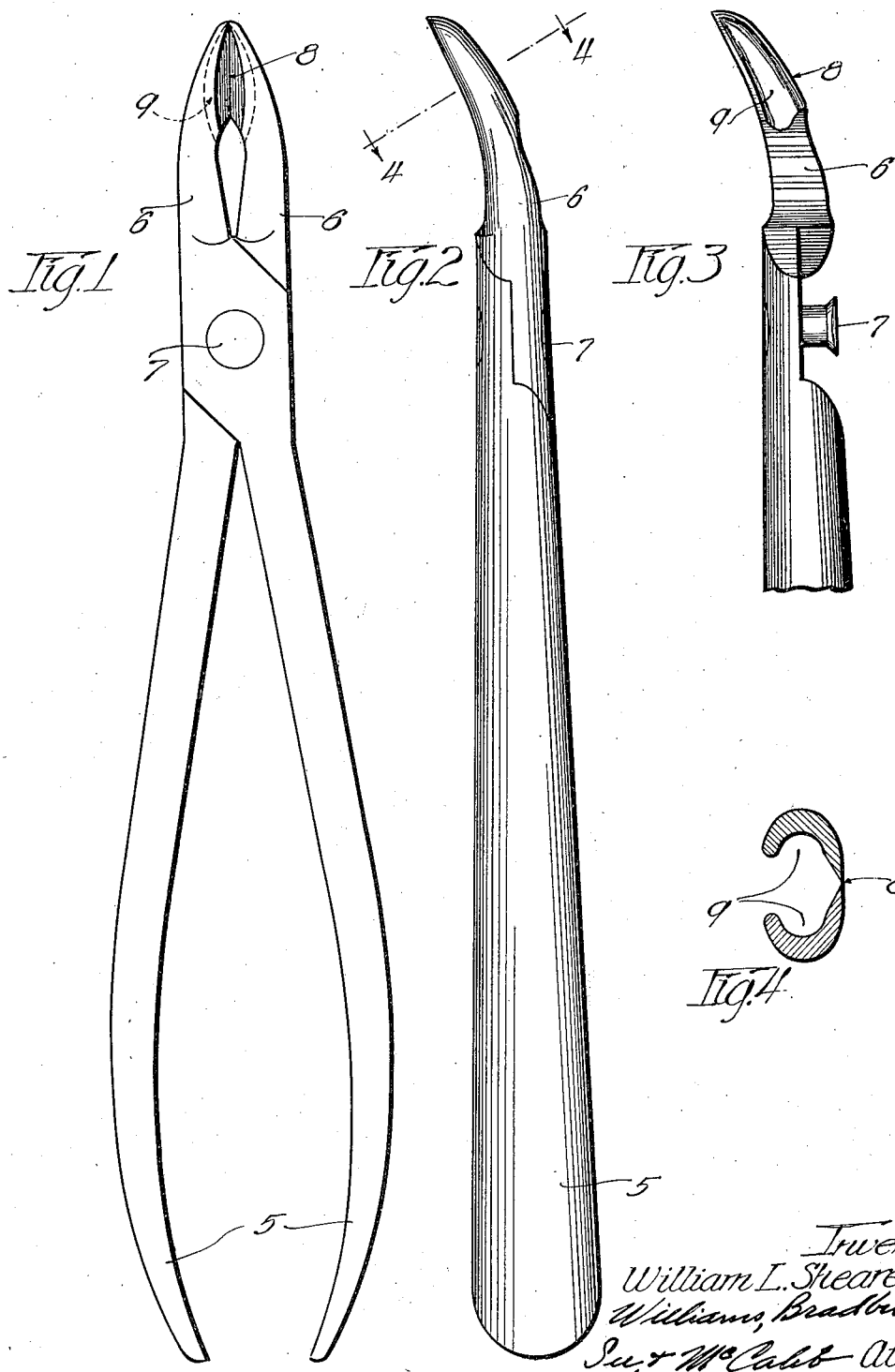

1,471,422

UNITED STATES PATENT OFFICE.

WILLIAM L. SHEARER, OF OMAHA, NEBRASKA, ASSIGNOR TO DENTAL PRODUCTS COMPANY, OF CHICAGO, ILLINOIS, A CORPORATION OF ILLINOIS.

BONE-CUTTING FORCEPS.

Application filed April 30, 1921. Serial No. 465,716.

*To all whom it may concern:*

Be it known that I, WILLIAM L. SHEARER, a citizen of the United States, and resident of Omaha, in the county of Douglas and State of Nebraska, have invented a certain new and useful Improvement in Bone-Cutting Forceps, of which the following is a full, clear, concise, and exact description, reference being had to the accompanying drawings, forming a part of this specification.

My invention relates to bone cutting forceps of the type used by dental surgeons. The invention contemplates certain improvements in the construction of the beak of a device of this class and has for its objects:—

First—the provision of a bone cutting forceps having an open faced beak which permits the operator at all times to see the cutting edges of the device and to determine the exact amount of bone that will be removed by the operation of the forceps.

Second—the provision of a bone cutting forceps having cutting jaws which are conformed and adapted to prevent pieces of severed bone from flying through the open face of the forceps.

Third—the provision of a bone cutting forceps having a beak that is very strong in comparison with its size and the amount of metal used in its construction.

In the accompanying drawing:

Figure 1 is a front elevational view of a forceps embodying my invention.

Figure 2 is a side elevational view of the same.

Figure 3 is a fragmentary side elevational view of one of the jaws of the device; and Figure 4 is a section on line 4—4 of Figure 2.

The forceps illustrated in the drawing comprises the handles 5—5 and the cutting jaws 6—6, the jaws being pivoted by the rivet 7. My invention is concerned solely with the conformation and manner of co-operation of the cutting jaws; hence, the construction of the handles and the means for securing the relatively moving parts of the device together may be of conventional or any other suitable form.

The beak formed by the extremities of the cutting jaws 6—6 is preferably turned forwardly from the plane of the handles and its rear and lateral surfaces are preferably curved to a point, as illustrated in Figures 1 and 2. It will be noted that the tip of each of the jaws is substantially channel shaped in cross section, with the rear side of the channel longer than the forward side. The cutting edges 8—8 are formed on the rear sides of the channels and meet in a plane which intercepts the axis of the rivet 7. Since the forward sides of the channels are shorter than the rear sides, there is always a substantial open space between the forward sides of the channels through which the operator may view the cutting edges and determine the exact amount of bone which he desires to remove. The channel formation of the cutting jaws provides recesses 9—9 which serve to prevent severed bone from being thrown out between the spaced forward sides of the channels. Severed bone naturally tends to fly sidewise in the forceps. Hence, in practically all cases the severed bone is thrown into one or the other of the recesses 9—9 and shows no tendency to fly through the sight opening between the spaced forward sides of the channel shaped cutting jaws. The discomfort to patients and annoyance to the operator which result from the flying of severed bone is practically eliminated by the forceps construction herein shown and described.

What I claim is new and desire to secure by Letters Patent of the United States is:

1. A bone cutting forceps comprising a pair of cutting jaws having opposed tips that are substantially channel shaped in cross section, the rear sides of the channel shaped jaw tips being provided with cutting edges, the forward sides of the jaw tips being shorter than the rear sides thereof, each channel shaped jaw tip affording a pocket for particles of bone, the cutting edges being visible through the space between the forward sides of the channel shaped jaw tips.

2. In a bone cutting forceps, a pair of jaws including co-operating cutting edges at the rear thereof, said jaws being curved upwardly and inwardly from said edges to provide pockets to receive particles of bone severed by said edges, the upper extremities of said jaws being spaced apart when said edges are in engagement.

In witness whereof, I hereunto subscribe my name this 25th day of April, 1921.

WILLIAM L. SHEARER.

Witnesses:
 JESSIE R. DAVIS,
 ALVIN C. AHLBERG.